Feb. 10, 1948.     M. N. BOSKOVICH     2,435,669
MECHANICAL MUCKER
Filed Aug. 14, 1944     4 Sheets-Sheet 2
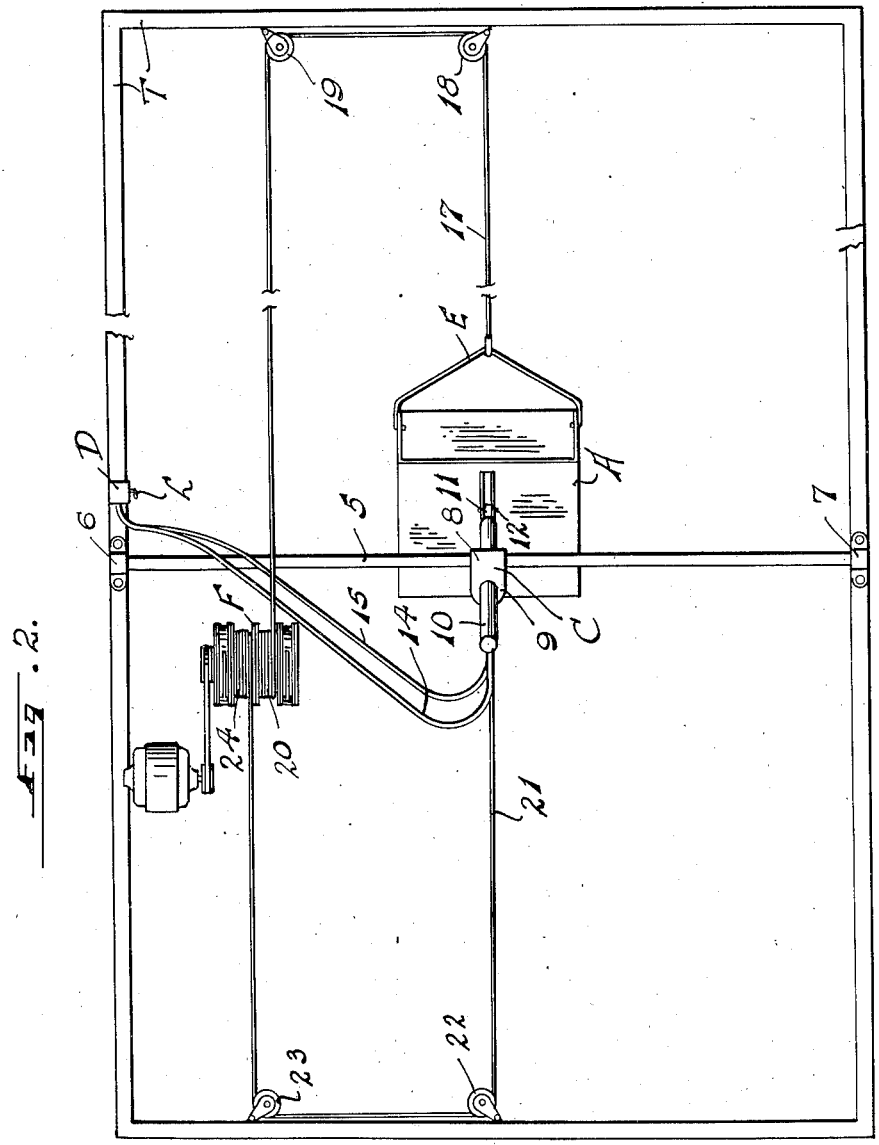
Inventor
Milan N. Boskovich
By R. M. Thomas
Attorney

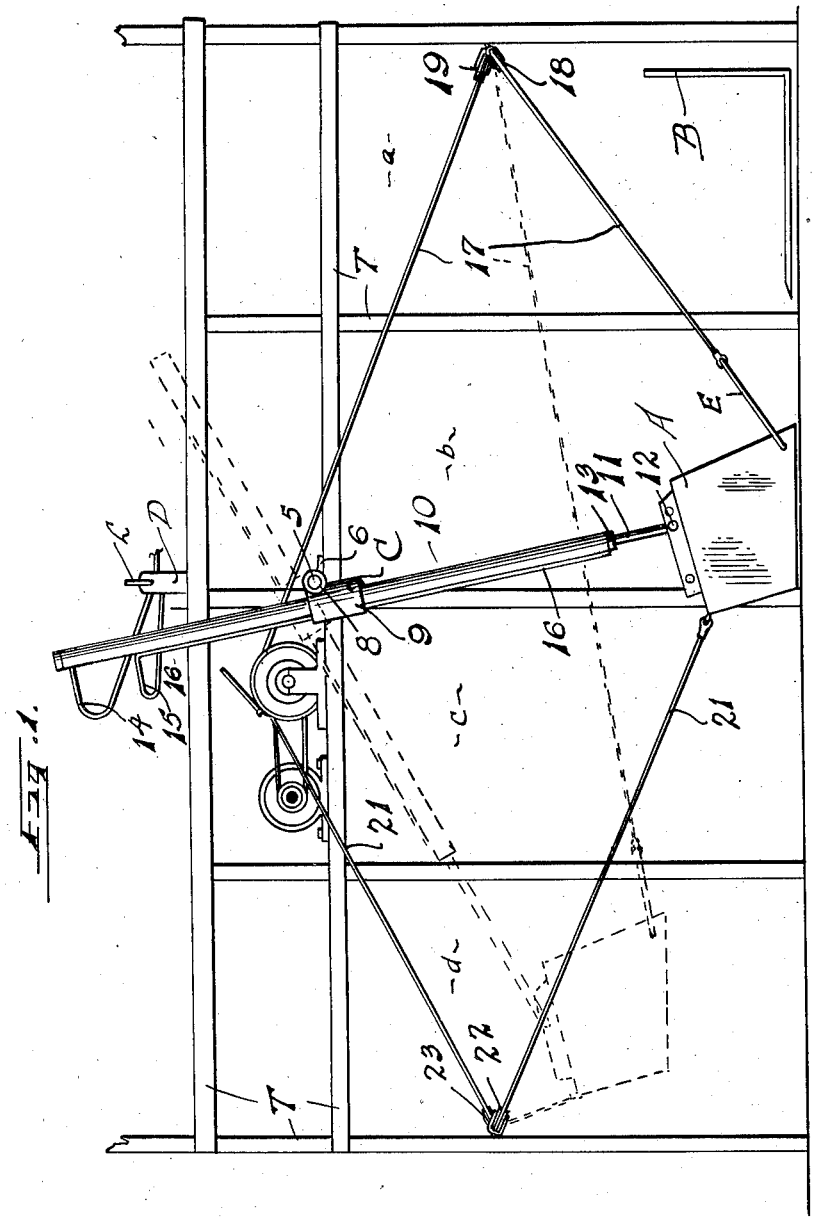

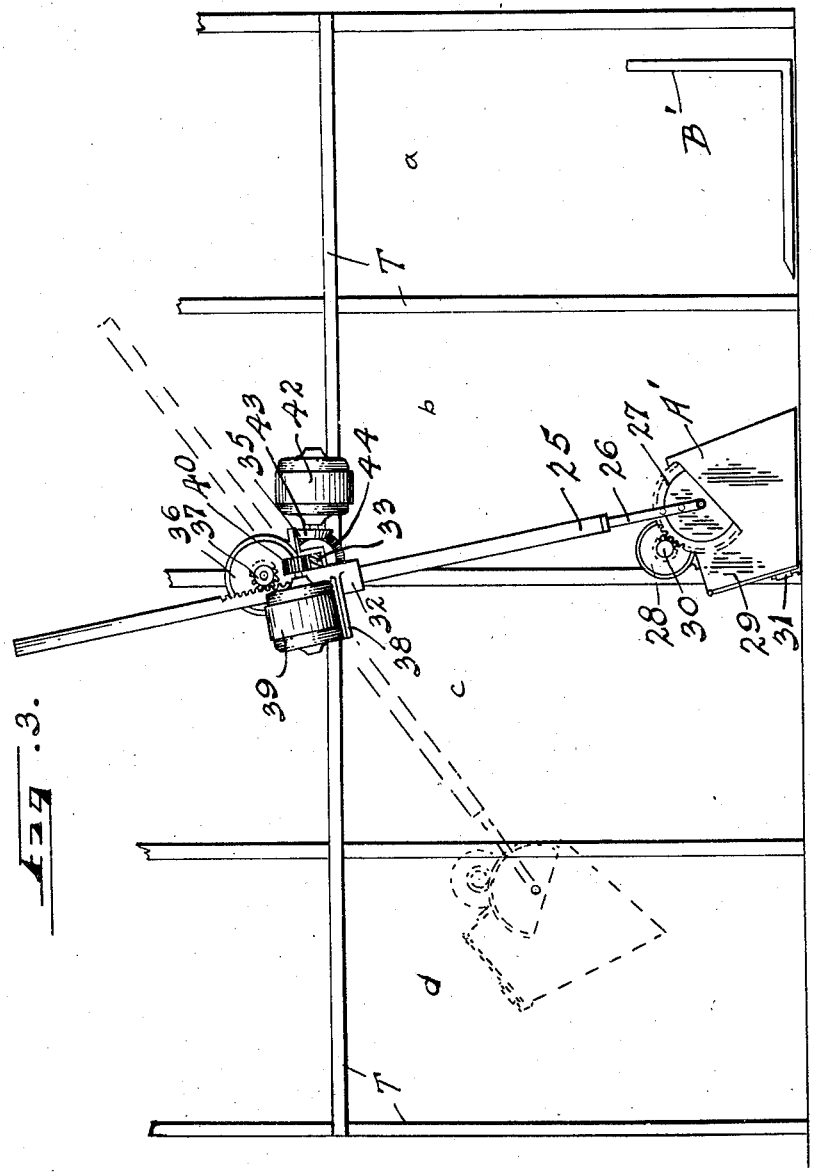

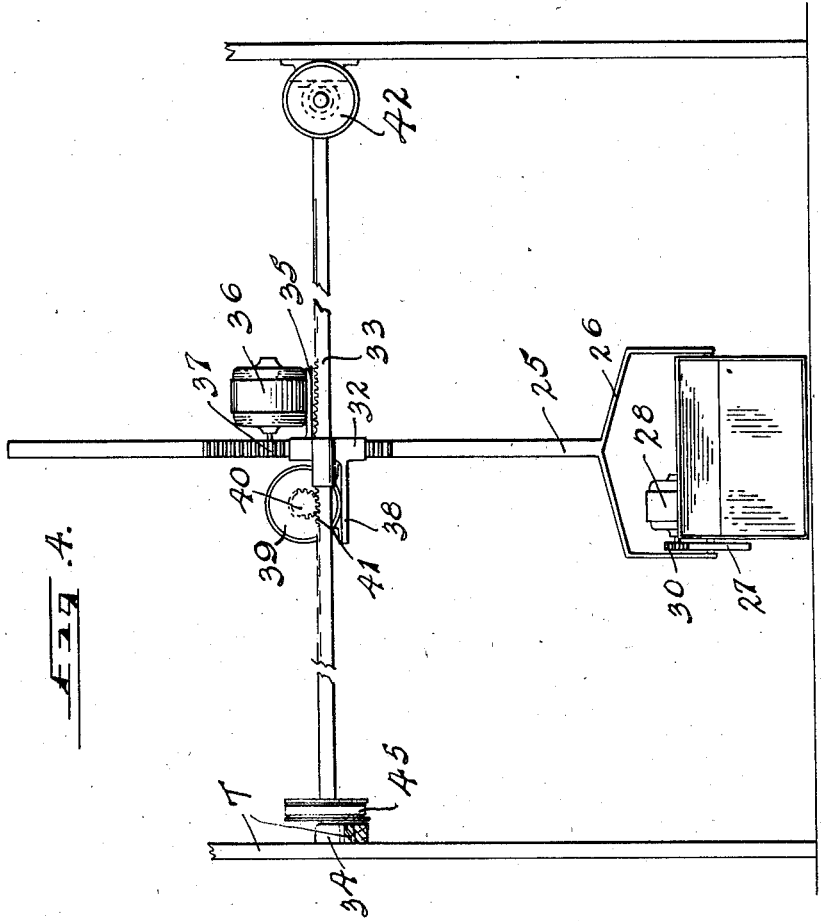

Patented Feb. 10, 1948

2,435,669

UNITED STATES PATENT OFFICE 2,435,669

MECHANICAL MUCKER

Milan N. Boskovich, Midvale, Utah, assignor of forty-nine one-hundredths to Arthur O. Hall Application August 14, 1944, Serial No. 549,362

1 Claim. (Cl. 214—141)

My invention relates to mining and has for its object to provide a new and highly efficient mechanical mucker to take the place of hand mucking saving much valuable time and money.

A further object is to provide a mechanical mucker operated either by air pressure or by electrical motors which will load a skip or bucket to be elevated under the cage or in any suitable mine shaft manner of elevating and which will be easily and quickly operated, loading the skip or bucket at any predetermined position.

A still further object is to provide a mucking device which may be used in a multiple shaft mine or in a tunnel or stope which will be used to muck in any desired place in the mine.

These and many other objects I accomplish with the device illustrated in the accompanying drawings in which similar numerals and letters or reference indicate like parts throughout the several views and as described in the specification forming a part of this application and pointed out in the appended claim.

In the drawings

Figure 1 is a diagrammatic side elevation of the device driven and operated by compressed air.

Figure 2 is a plan view of Figure 1.

Figure 3 is a side elevation of an electrically operated mucker.

Figure 4 is an end view of Figure 3.

In the drawings Figures 1 and 2 show the use of air to operate the mucking scoop or bucket A to load the skip B or bucket, should such be used. The shafts are shown as $a$, $b$, $c$ and $d$ and the timbering is shown as T.

Transversely across the shafts I mount a cross shaft or support 5 mounted in bearings 6 and 7 at each side of the shaft. On the shaft 5 there is a bearing block C made of a bearing 8 riding on the shaft 5 and a transversely formed bearing in which the operating cylinder 10 of the mucker is mounted and carried. The cylinder 10 carries a piston therein operating a piston rod 11 therein with the end of the cylinder provided with a bearing and sealing member 13 to guide the rod 11 and provide air seal for the lower end of the cylinder. The air supply is provided from an air source (not shown), to a control stand D with a hand lever L to control the flow of air. The air leads to the top of the cylinder 10 through an air hose 14 and to the lower end of the cyiln- der 12 through an air hose 15 which is connected to an air pipe 16 extending down the side of the cylinder 10 to the lower end thereof where it is turned in and in open connection with the interior of the cylinder. Thus air is supplied above and below the piston in the cylinder to move the piston rod reciprocally within the cylinder. The bucket is mounted onto the end of the rod 11 by the pin 12. With this air pressure the bucket may be raised or lowered by raising or lowering the piston rod in the cylinder. To move the bucket or scoop A forward and backward the front end of the bucket is provided with a bail E to which a cable 17 is attached. This cable 17 is carried forward around a sheave wheel 18 across and through a sheave wheel 19 and back to a drum 20 on double drum hoist F. The cable is wound around the drum and secured thereto for drawing the scoop or bucket A forward for loading it and moving the load to the skip. The back side of the bucket is provided with a cable 21 attached thereto and carried through a sheave 22 mounted at the end of the chamber being mucked and across through a sheave 23 and forward to the drum 24 of the double drum hoist F. Thus rotation of the hoist drums in one direction withdraws the bucket from the skip and moves it to the rear for loading and the winding of the cable on the drum 20 carries the bucket A forward loading it and carrying the load to the scoop. When loaded the load may be lifted from the floor by the compressed air cylinder 10 and held there until ready for dumping on the skip B. This may be done by raising the rear end of the bucket to slide the material therefrom.

The hoist F may be either air operated or motor driven, that shown in the drawings being motor driven but any suitable air hoist may be used with equal efficiency.

In Figures 3 and 4 I have shown the scoop or bucket as A' and the hoist or skip as B'. The scoop A is mounted on the lower end of a rack bar 25 by a bifurcated bail 26. A segment gear 27 is mounted to the bail and a motor 28 is mounted on the scoop A' with a pinion 30 meshing with the teeth in the segment gear. Thus partial rotation of the motor will tilt the bucket or scoop to any desired angle. The bottom of the scoop is closed by a gate 29 and a catch 31 normally holds the bucket closed. This gate may be used for dumping the bucket when it is elevated above a barrel or hoist bucket. The rack bar 25 is extended up through a bearing block 31 mounted on a transverse support bar 33. This is a square bar and is provided with support bearings 34 one at each end thereof to support the entire assembly. Extending from one side of the block 31 there is a motor support base 35 for supporting the motor 36 for elevating the rack bar 25. A pinion 37 meshes with the teeth of the rack bar 25 and is mounted on the shaft of the motor 36 and rotated thereby. Another motor support base 38 is extended from the opposite side of the block 31 and supports the motor 39 which motor drives a pinion 40 meshing with teeth 41 formed in the top side of the support bar 32. Thus the bucket and bearing block assembly may be moved from one side to the other of the shaft or stope in which it is being used. The entire assembly and support bar 32 may be partially rotated to tilt the rack bar for longitudinal movement of the bucket A' by a motor 42 mounted at the side wall of the shaft or stope at bearing 34 driving a bevel pinion 43 meshing with a bevel ring gear 44 mounted on the end of the shaft or bar 32 near the sidewall of the shaft. The motors 42 and 28 are limited throw motors being limited in their rotations by suitable means. A brake drum 45 is mounted on the shaft bar 32 to check its rotative movement when required.

Having thus described my invention, I desire to secure by Letters Patent and claim:

A mechanical mine shaft mucker of the class described comprising a transverse shaft mounted between the sidewalls of a mine shaft; a cylinder carried depending from the transverse shaft; a piston operating in said cylinder having a piston rod extending beyond the end of said cylinder; a bucket pivotally mounted to the free end of said piston rod; means to raise and lower the piston and rod in said cylinder; and means to operate the bucket comprising cables attached to opposite portions of the bucket and trained about guides supported at opposite walls of the mine shaft, whereby the bucket may be filled and emptied as desired.

MILAN N. BOSKOVICH.

REFERENCES CITED

The following references are of record in the file of this patent:

UNITED STATES PATENTS

| Number | Name | Date |
| --- | --- | --- |
| 436,928 | Thew | Sept. 23, 1890 |
| 553,082 | Thew | Jan. 14, 1896 |
| 564,727 | Trainor | July 28, 1896 |
| 655,758 | Cheney et al. | Aug. 14, 1900 |
| 820,055 | Libbe | May 8, 1906 |
| 863,368 | Durfee | Aug. 13, 1907 |
| 1,048,244 | Ward | Dec. 24, 1912 |
| 1,162,607 | Hoar | Nov. 30, 1915 |
| 1,665,378 | Peterson | Apr. 10, 1928 |
| 1,902,457 | Mendelsohn | Mar. 21, 1933 |
| 1,973,136 | Atkinson | Sept. 11, 1934 |
| 2,147,634 | Campbell | Feb. 21, 1939 |
| 2,326,172 | Riddell | Aug. 10, 1943 |
| 2,348,796 | Ferwerda et al. | May 16, 1944 |
| 2,358,543 | Tofflemire | Sept. 19, 1944 |

FOREIGN PATENTS

| Number | Country | Date |
| --- | --- | --- |
| 177,524 | Germany | Oct. 27, 1906 |
| 486,168 | Germany | Nov. 11, 1929 |